(12) United States Patent
Arimura et al.

(10) Patent No.: US 10,275,616 B2
(45) Date of Patent: Apr. 30, 2019

(54) TRANSMISSION/RECEPTION SENSOR SYSTEM, MULTI-FUNCTION CARD, AND WEARABLE DEVICE

(71) Applicants: Smart Co., Ltd., Kanagawa (JP); IIGA Co., Ltd., Tokyo (JP)

(72) Inventors: Kunitaka Arimura, Kanagawa (JP); Noritaka Abe, Tokyo (JP)

(73) Assignees: Smart Co., Ltd., Kanagawa (JP); IIGA Co., Ltd., Tokyo (JP)

( * ) Notice: Subject to any disclaimer, the term of this patent is extended or adjusted under 35 U.S.C. 154(b) by 0 days.

(21) Appl. No.: 15/661,249

(22) Filed: Jul. 27, 2017

(65) Prior Publication Data

US 2017/0351884 A1 Dec. 7, 2017

Related U.S. Application Data

(63) Continuation of application No. PCT/JP2016/052441, filed on Jan. 28, 2016.

(30) Foreign Application Priority Data

Jan. 28, 2015 (JP) .................................. 2015-014250

(51) Int. Cl.
*G06K 7/08* (2006.01)
*G06K 7/10* (2006.01)
(Continued)

(52) U.S. Cl.
CPC .............. *G06K 7/087* (2013.01); *G06K 7/10* (2013.01); *G06K 7/10297* (2013.01); *G06K 7/10336* (2013.01); *G06K 19/06* (2013.01); *G06K 19/06196* (2013.01); *G06K 19/06206* (2013.01); *G06K 19/07* (2013.01); *G06K 19/077* (2013.01); *G06K 19/0772* (2013.01);
(Continued)

(58) Field of Classification Search
USPC .................................................. 235/435–454
See application file for complete search history.

(56) References Cited

U.S. PATENT DOCUMENTS 8,313,037 B1 11/2012 Humphrey
2006/0151619 A1 7/2006 Ninomiya
(Continued)

FOREIGN PATENT DOCUMENTS

EP 0821430 A2 1/1998
EP 2667447 A1 11/2013
(Continued)

*Primary Examiner* — Jamara Franklin
(74) *Attorney, Agent, or Firm* — James Creighton Wray

(57) ABSTRACT

A multi-function card has a non-contact IC card function, a magnetic stripe card function, a function of generating a magnetic card signal and an NFC signal, and a Bluetooth function capable of transmitting a signal to devices such as smartphones. The multi-function card includes a metallic frame, and is robust against bending or breakage. A transmission/reception sensor system is used for the multi-function card or the like, and for a wearable device. The transmission/reception sensor system includes a magnetic sensor 10 including a coil 2 wound around a magnetic sensor core 1, and an NFC coil 12 formed in a planar shape. A metallic frame having of a loop shape is installed along the NFC coil 12 and includes one or more cut portions.

14 Claims, 8 Drawing Sheets

(51) Int. Cl.
    *G06K 19/06*     (2006.01)
    *G06K 19/07*     (2006.01)
    *G06K 19/077*    (2006.01)
    *H01Q 7/06*      (2006.01)
    *H01Q 1/22*      (2006.01)
    *H01Q 9/06*      (2006.01)
    *H01Q 13/10*     (2006.01)

(52) U.S. Cl.
    CPC ............ *H01Q 1/2291* (2013.01); *H01Q 7/06* (2013.01); *H01Q 9/065* (2013.01); *H01Q 13/10* (2013.01)

(56) References Cited

U.S. PATENT DOCUMENTS

| | | |
|---|---|---|
| 2009/0315680 A1 | 12/2009 | Arimura |
| 2010/0243732 A1 | 9/2010 | Wallner |
| 2011/0272466 A1 | 11/2011 | Mullen |
| 2012/0071090 A1* | 3/2012 | Charrat ............ G06K 19/07769 455/41.1 |
| 2014/0035793 A1 | 2/2014 | Kato |
| 2014/0168019 A1 | 6/2014 | Hirobe |
| 2014/0198006 A1 | 7/2014 | Nakano |
| 2014/0375262 A1 | 12/2014 | Yamaguchi |
| 2015/0279554 A1 | 10/2015 | Ryoson |

FOREIGN PATENT DOCUMENTS

| | | |
|---|---|---|
| JP | 2008042761 A | 2/2008 |
| JP | 2012195663 A | 10/2012 |
| JP | 2013009071 A | 1/2013 |
| JP | 2014127751 A | 7/2014 |
| JP | 2014183193 A | 9/2014 |
| WO | 2014148312 A1 | 9/2014 |
| WO | 2014155689 A1 | 2/2017 |

* cited by examiner

MAGNETIC SIGNAL

NFC SIGNAL

MAGNETIC SIGNAL

NFC SIGNAL 13.56MHz or BPF

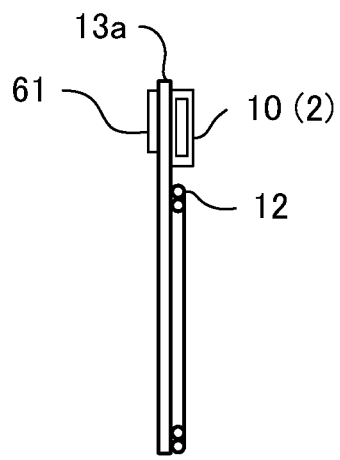
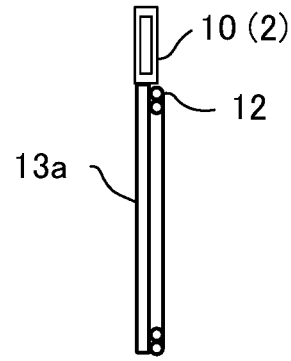
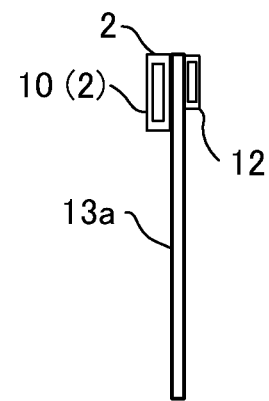
Fig. 4(a)  Fig. 4(b)  Fig. 4(c)
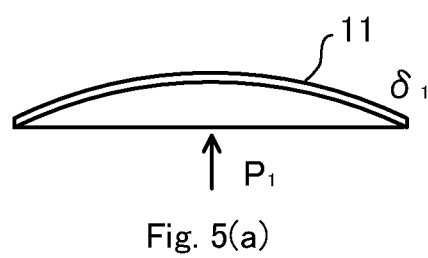
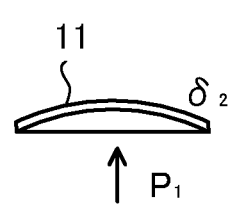
Fig. 5(a)  Fig. 5(b)
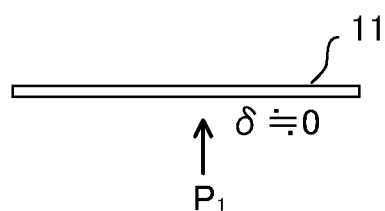
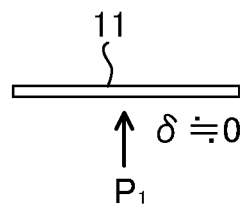
Fig. 5(c)  Fig. 5(d)

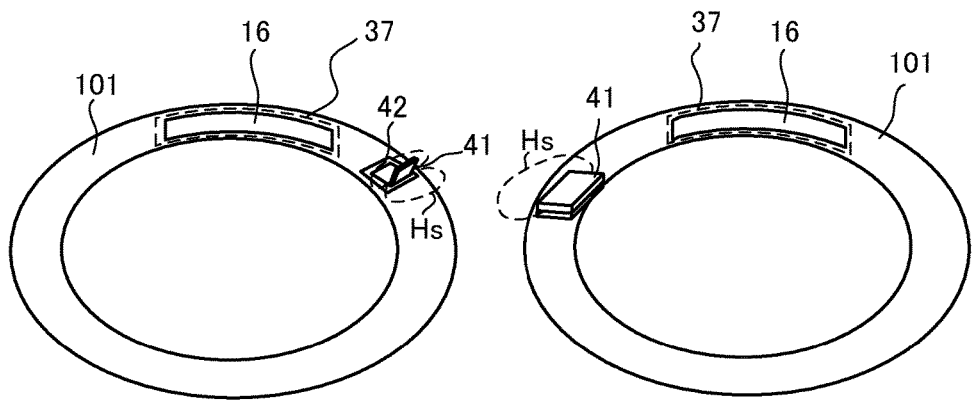
Fig. 8(a)  Fig. 8(b)
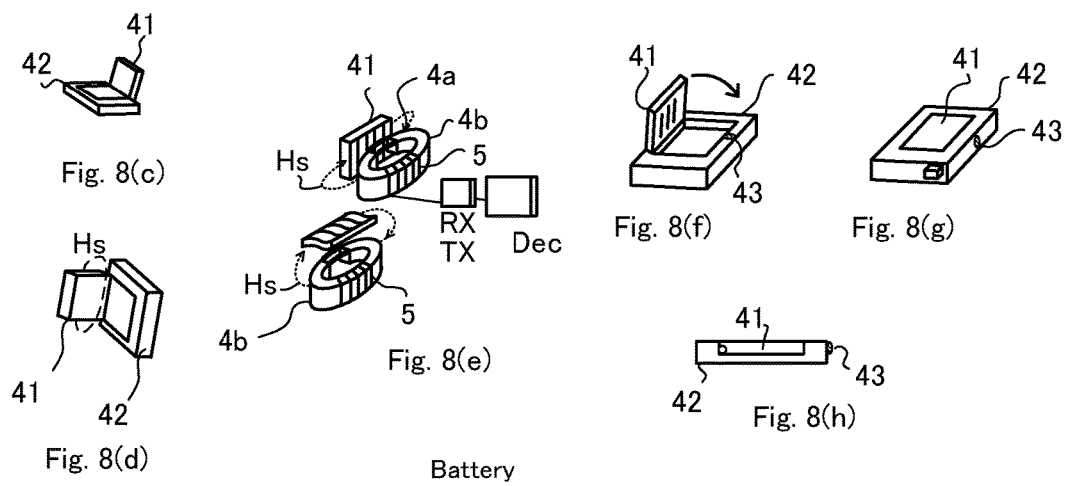
Fig. 8(c)  Fig. 8(e)  Fig. 8(f)  Fig. 8(g)
Fig. 8(d)  Fig. 8(h)
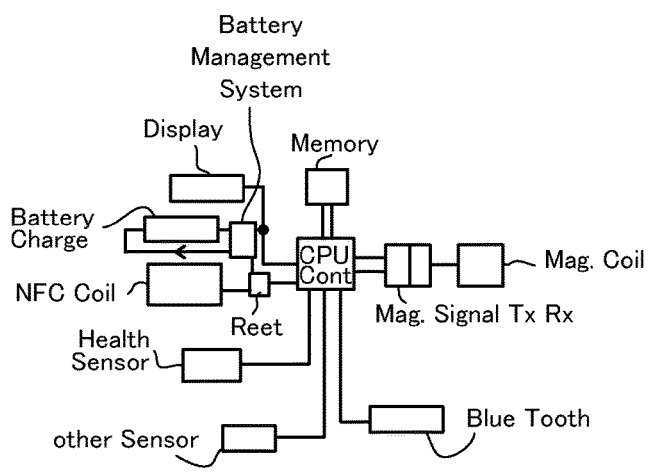
Fig. 8(i)

TRANSMISSION/RECEPTION SENSOR SYSTEM, MULTI-FUNCTION CARD, AND WEARABLE DEVICE

CROSS-REFERENCE TO RELATED APPLICATION

The present application is a continuation application of International Application No. PCT/JP2016/052441, filed Jan. 28, 2016, which claims priority to Japanese Patent Application No. 2015-014250, filed Jan. 28, 2015. The contents of these applications are incorporated herein by reference in their entirety.

BACKGROUND

Field

The present invention relates to a multi-function card which can be used for various purposes as a quasi-magnetic card or an IC card performing a similar operation to a magnetic card, operates on a metallic surface, is protected by a metallic frame to have a strong bending strength, and has functions such as magnetic card emulation, non-contact communication (NFC), and Bluetooth, a transmission/reception sensor system used for the multi-function card or the like, and a wearable device.

Description of the Related Art

Electronic money is becoming widespread, but the diffusion rate of NFC readers is still around 20% at most, there are many users of magnetic cards, and magnetic cards have been increasingly used. In order to increase security of magnetic cards, a method of generating a magnetic signal for integrating a plurality of cards into one through an integrated circuit (IC) with no necessity of carrying a plurality of cards has been proposed. Further, a method of emulating a magnetic card has been invented. This is a method of generating a signal similar to a signal generated when a magnetic card is scanned, transmitting the signal to a magnetic coupling antenna, and causing it to be coupled to a coil of a receiving magnetic head.

Further, a method of performing transmission and reception of signals with a non-contact type IC card is also considered. Furthermore, a method of performing communication with a mobile terminal through Bluetooth is also considered. Moreover, cards having a display device, cards in which biometric authentication such as fingerprint verification is performed, and the like have also been proposed.

Since the cards are multifunctional, a semiconductor, a display device, or the like is contained within a card thickness of 0.76 mm±10%, and thus the cards are weak in strength and likely to be damaged. If the cards are used together with a mobile terminal having a metallic surface such as iPhone, they may be unable to be used due to influence of the metallic surface. Further, since various functions are put into the card, it is currently necessary to downsize an antenna. In recent years, in addition to cards, small-sized wearable devices such as bracelets and wristwatch-like wearable devices have begun to be supplied to the market.

Patent Document 1: US 2011/0272466 A, Patent Document 2: U.S. Pat. No. 8,313,037 and Patent Document 3: US 2010/0243732 A can be cited as conventional art.

SUMMARY

However, when the cards are bent, the cards are likely to be broken, and when it comes into contact with the metallic surface, an NFC coil is unable to be shared. Further, when a metallic frame for reinforcement is employed, there is a problem in that an electric current is canceled, and a magnetic field is diminished, and when it is in close contact with metal, there is a problem that no magnetism occurs.

The invention was made to solve the above problems, and it is an object of the invention to provide a multi-function card which has a non-contact IC card function, a magnetic stripe card function, a function of generating a magnetic card signal and an NFC signal, and a Bluetooth function capable of transmitting a signal to devices such as smartphones, includes a compact antenna and a metallic frame, and which is robust against bending or breakage, a transmission/reception sensor system used for the multi-function card or the like, and a wearable device.

The invention can solve the above problems by employing the following configurations.

(1) A transmission/reception sensor system, including:
a magnetic sensor including a coil wound around a magnetic sensor core;
an NFC coil formed in a planar shape; and a metallic frame of a loop shape which is installed along the NFC coil and includes one or more cut portions.

(2) The transmission/reception sensor system according to (1),
in which the magnetic sensor further includes a coil wound orthogonally to the coil wound around the magnetic sensor core.

(3) The transmission/reception sensor system according to (1) or (2),
in which the metallic frame has a hollow rectangular shape, and the cutting portion is formed in a short side portion of the rectangular shape.

(4) The transmission/reception sensor system according to any one of (1) to (3),
in which a magnetic sheet is interposed between the metallic frame and the NFC coil.

(5) The transmission/reception sensor system according to any one of (1) to (4),
in which the metallic frame has a slot with a length of a quarter-wavelength, and the slot is used as an antenna for Bluetooth.

(6) The transmission/reception sensor system according to any one of (1) to (4),
in which a stripline of a quarter-wavelength or a half-wavelength is installed in the metallic frame, and the stripline is used as a microstrip antenna.

(7) A transmission/reception sensor system according to any one of (1) to (6), including:
a magnetic sensor including a coil wound around a first magnetic sensor core; and
an NFC antenna including a second magnetic sensor core, a coil wound around the second magnetic sensor core, and an NFC coil formed on one surface of the second magnetic sensor core in a planar shape.

(8) A transmission/reception sensor system according to any one of (1) to (7), including:
a magnetic sensor including a coil wound around a first magnetic sensor core;
an NFC antenna including a second magnetic sensor core, a coil wound around the second magnetic sensor core, and an NFC coil formed on one surface of the second magnetic sensor core in a planar shape; and
a metallic plate on which the magnetic sensor and the NFC antenna are installed.

(9) The transmission/reception sensor system according to (7) or (8), in which the first magnetic sensor core of the magnetic sensor and the second magnetic sensor core of the NFC antenna are shared, and the coil of the magnetic sensor and the wound coil of the NFC antenna are wound around a common magnetic sensor core.

(10) The transmission/reception sensor system according to (7) or (8), in which the first magnetic sensor core of the magnetic sensor and the second magnetic sensor core of the NFC antenna are shared, the coil of the magnetic sensor and the wound coil of the NFC antenna are wound around a common magnetic sensor core as a common coil, and a signal of the magnetic sensor and a signal of the NFC antenna are separated by a filter.

(11) The transmission/reception sensor system according to (9) or (10), in which the common magnetic sensor core is constituted by two magnetic substances having different magnetic permeabilities.

(12) The transmission/reception sensor system according to any one of (1) to (11), further including, a battery, in which the battery is charged with electric power induced in the NFC coil formed in a planar shape and in a magnetic sensor coil.

(13) A multi-function card having a function of generating an emulation signal of a magnetic card, including:

a plastic card case; and the transmission/reception sensor system according to any one of (1) to (12).

(14) A wearable device, including:

the transmission/reception sensor system according to any one of (1) to (12).

According to the invention, it is possible to provide a transmission/reception sensor system used for a multi-function card in which a part of a metallic frame is cut, strength of a card is increased without influencing a magnetic field of a coil, NFC communication is not disturbed, an antenna is compact, a magnetic sensor is also shared, and a battery, an IC, a substrate, and a display device are protected from bending. Further, it is possible to use a part of the metallic frame of the multi-function card for an antenna for Bluetooth. Furthermore, it is possible to provide a transmission/reception sensor system used for wearable devices which will be widely used in the future.

BRIEF DESCRIPTION OF THE DRAWINGS

FIGS. 4(a) to 4(c) are diagrams illustrating cross sectional structures of a card according to the first embodiment.

FIGS. 5(a) to 5(d) are diagrams for describing a bending strength of a card and a metallic frame according to the first embodiment.

FIGS. 8(a) to 8(i) are diagrams for describing a state in which a small magnetic sensor is attached to a bracelet-shaped wearable device according to a second embodiment.

DETAILED DESCRIPTION

Hereinafter, exemplary modes for carrying out the invention will be described in detail on the basis of embodiments.

Embodiment 1

Figure 1A:
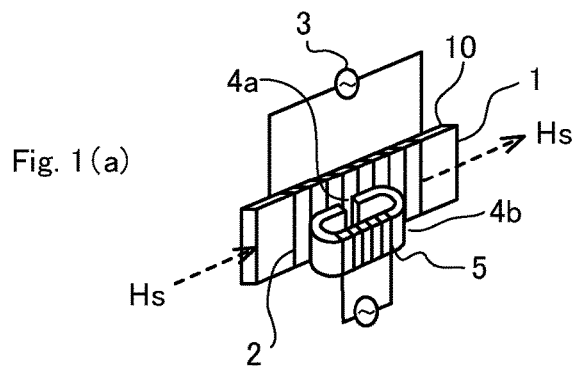
FIGS. 1(a) to 1(c) are diagrams illustrating coupling between a magnetic sensor and a magnetic head according to a first embodiment.

In the present embodiment, an example in which a transmission/reception sensor system of the invention is applied to a multi-function card. FIG. 1(a) illustrates a coupling state between a magnetic sensor 10 and a magnetic head 4a constituting the transmission/reception sensor system, and an emulated signal of a magnetic card is illustrated in FIG. 1(c). A signal voltage generating IC 3 is a signal generation source that generates the signal. There are many types of signals depending on a type of card, and signals of these cards are read through a sensor in advance and stored in a memory. The signal generated by the signal voltage generating IC 3 excites a flat magnetic sensor core 1 with a thickness of about 0.1 to 0.5 mm through a magnetic sensor coil 2 of the magnetic sensor 10 and generates a magnetic field Hs of a magnetic card signal. The magnetic field Hs is read by the magnetic head 4a on a reader side which is approaching and causes the same signal to be induced in a coil 5 on the reader side which is wound in a magnetic path of a magnetic circuit 4b.

Since the signal is the same signal as the signal read by the magnetic head 4a when the magnetic card is swiped, the same emulated signal flows as a coil current regardless of whether or not the magnetic sensor 10 is moved, and thus the signal can be easily read from the magnetic head 4a on the reader side. A recorded original card type signal is identified through a display device installed in a card. The display device of the card will be described later.

Figure 1:
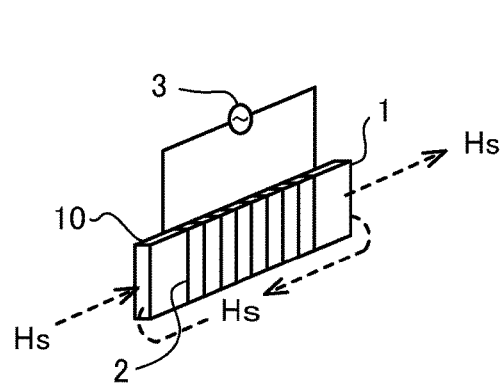
Figure 1:
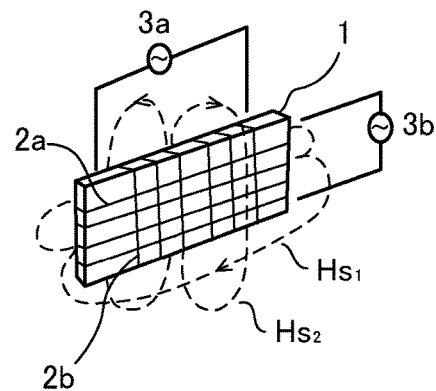
Figure 1C:
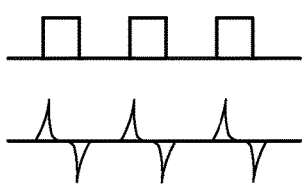

FIG. 1(b1) illustrates a state in which a signal current of the signal voltage generating IC 3 flows to the magnetic sensor coil 2 wound around the magnetic sensor core 1 of the magnetic sensor 10, and the magnetic field Hs is generated in an axial direction of the magnetic sensor coil 2. The magnetic sensor core 1 may be a flexible magnetic substance or may be a flexible substance in which powders obtained by crushing permalloy, sendust, or ferrite are hardened with rubber or plastic. The magnetic sensor core 1 may be a small thin substance having high magnetic permeability at low frequency.

It is possible to generate a magnetic field enough to induce the magnetic head 4a on the reader side even through a local leakage magnetic field generated by the magnetic sensor coil 2, and thus, it is possible to generate the signal in the coil 5 wound around the core. In short, it is possible to cause the magnetic field to be coupled to the magnetic head 4a on the reader side at any position of the magnetic sensor core 1 contained in the card, cause the signal voltage to be generated in the pick-up coil 5, and transmit the signal.

FIG. 1(b2) illustrates an example in which a coil 2a and a coil 2b which are orthogonally wound around a flat magnetic sensor core 1 are provided, and a magnetic field is outputted in any direction. It is effective when the card is placed laterally or when the card is used in a wearable device. Examples of the excitations method include a switching method, a 90° phase method, a serial method, and a parallel method.

Figure 2A:
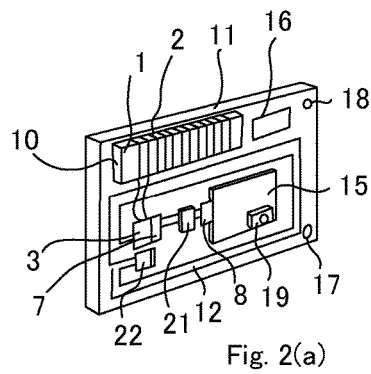
FIGS. 2(a) to 2(j) are diagrams illustrating a card containing a magnetic sensor and the like according to the first embodiment, illustrating a magnetic field of a magnetic sensor and a magnetic field of an NFC card coil, and illustrating a shared antenna example.

A magnetic sensor, a card coil, and an NFC metal-compatible antenna constituting the transcending sensor system of the invention will be described with reference to FIGS. 2(a) to 2(j). FIG. 2(a) illustrates an example in which the magnetic sensor 10 is installed at a position at which a magnetic stripe of a card 11 is attached in a conventional manner. The magnetic sensor 10 is illustrated as being installed on the upper side of the card 11, but the magnetic sensor 10 may be installed may be a lower side or a side surface. A track of a magnetic tape may be separate or common. The same applies to a front side or a back side. Since there is an embossed part on the lower side, the magnetic sensor 10 is likely to be damaged, and when it is installed at a position corresponding to the magnetic stripe on the upper side, it does not give an uncomfortable feeling. The track of the magnetic tape is used even when card power is not supplied. In flat cards with no embossed part, a sensor portion can be installed on the lower side or the lateral side.

The transmission (reception) signal voltage generating IC 3 of the magnetic sensor coil 2 wound around the magnetic sensor core 1 of the magnetic sensor 10 includes a memory 7 and stores data of various cards. A function of generating or recording a magnetic signal, NFC, display, biometrics (biometric authentication), and the like are controlled by a controller or a CPU 21. An NFC IC chip 22 is connected to a card coil 12.

Charging/discharging control of a battery 15 is performed by a battery control element 8. As a charging method, the battery 15 may be charged with a voltage of around 5 V supplied from the outside through a charging adapter, or the battery 15 may be charged by performing voltage control and rectifying detection on electric power induced in the card coil 12 by high frequency power 13.56 MHz supplied from an external reader side, the frequency being half or twice the high frequency power 13.56 MHz, or the like. In this case, a method using a super capacitor that performs charging in a short time may be used. Such a charging method is a non-contact charging method, and there are a number of methods, but description thereof is omitted here.

The recorded card numbers, types of the cards and the like are displayed on a display device 16. The display device 16 may be an electronic paper which consumes electric power only temporarily or may be a display having low power consumption such as an LCD. The supply of electric power to a circuit by battery is turned on or off through a switch 17. When minimum power supply is necessary, standby power is supplied by the battery 15. When a power supply is turned on, it is displayed by an LED 18. Identity verification based on fingerprint verification or the like is performed by a biometric authentication device 19, and thus the card is prevented from being used improperly. Information of the magnetic card may be transmitted to a magnetic card reader through the magnetic sensor 10 or may be transmitted to an NFC reader via the card coil 12 when the magnetic card reader is not installed. Alternatively, the information may be transmitted to a device via Bluetooth.

Figure 2:
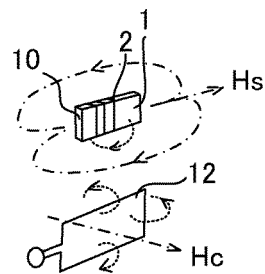
Figure 2:
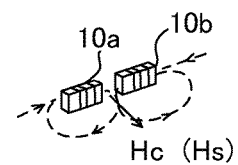

FIG. 2(b1) illustrates the magnetic field Hs of the magnetic sensor coil 2 and the magnetic field Hc of the card coil 12 of the NFC. As illustrated in FIG. 2(b1), the directions of the magnetic field are orthogonal, but since the magnetic field is continuous, a magnetic field in the same direction also appears. Further, a leakage magnetic field appears around the coil or the magnetic substance. FIG. 2(b2) illustrates an example in which two magnetic sensor cores 10a and 10b are excited by magnetic fields in opposite directions so that a vertical magnetic field is output from the center. The same applies when it is shared with the card coil 12 of the NFC.

Figure 2C:
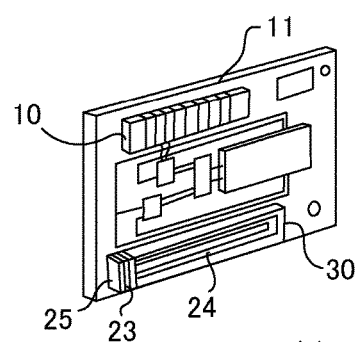

FIG. 2(c) illustrates an example in which it is constituted of an NFC metal-compatible antenna 30. A winding NFC coil 23 is wound around a high-frequency magnetic substance 25, and a magnetic field vertical to a magnetic substance surface is generated by a resonance NFC coil 24 wound closely to the winding NFC coil 23.

Figure 2D:
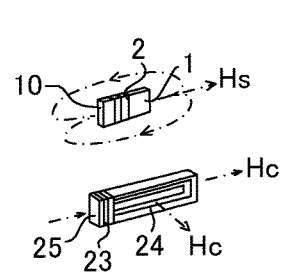

In FIG. 2(d), the magnetic sensor 10 is illustrated on the upper side, and the NFC metal-compatible antenna is illustrated on the lower side. Even when it is placed on the metallic surface, it is possible to generate a magnetic field parallel to the metallic surface through the winding NFC coil 23 and generate a vertical magnetic field Hc by exciting the resonance NFC coil 24.

Next, sharing of a magnetic sensor antenna and an NFC antenna which are components of the transmission/reception sensor system of the invention will be described with reference to FIG. 2(e) and sequent drawings.

The magnetic sensor core made of magnetic substance is shared by the magnetic sensor antenna and the NFC antenna. The magnetic sensor coil 2 and the winding NFC coil 23 may be wound around the same core separately or may be wound to overlap. Further, a common coil may be used. Since it is constituted by one magnetic sensor core or one antenna as described above, it is possible to downsize the antenna, and it is possible to easily secure an installation space of a battery, a semiconductor, a display device, and the like. FIG. 2(e) illustrates an example in which the magnetic sensor coil 2 and the winding NFC coil 23 are formed by a common coil in the common magnetic sensor core 1.

Figure 2E:
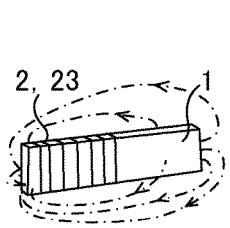

Since the magnetic field generated by the magnetic sensor coil 2 wound around the magnetic sensor core 1 in FIG. 2(e) is generated not only around the magnetic sensor coil 2 but also in a middle or end portions of the magnetic substance, when it comes into contact with the magnetic head 4a on the reader side, it can be sufficiently coupled. Even when it is not inserted into a slit of the reader, if the signal is strong, it can be coupled directly with the coil of the magnetic head 4a. Therefore, the magnetic sensor coil 2 may be entirely wound around the magnetic sensor core 1 or may be wound around a part of the magnetic sensor core 1. Since the magnetic sensor coil 2 is shared with the winding NFC coil 23, they can be constituted by one coil or one magnetic substance in which a low frequency magnetic sensor core and a high frequency magnetic sensor core are combined.

It is desirable to use a magnetic sensor core 1 having both an excellent low-frequency characteristic and an excellent high-frequency characteristic as the magnetic sensor core 1. For example, if one type of magnetic substances having an excellent high frequency characteristic is used, high magnetic permeability is unable to be obtained at a low frequency. Since an imaginary part of the magnetic permeability as well as not only a real part thereof similarly affects the characteristic and a loss problem occur, it is necessary to select a magnetic substance functioning at both frequency bands.

Figure 2F:
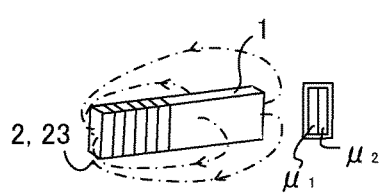
Figure 2G:
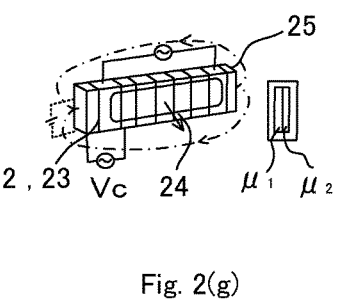
Figure 2H:
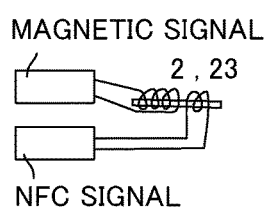

For example, as the magnetic substances of the magnetic substance core, metal magnetic substances (FINEMET) with magnetic permeability $\mu_1$ high at a low frequency band and better characteristic, permalloy, sendust metal substance, and ferrite having relatively large particles, or the like may be used, but it is preferable to use ferrite having a small loss and high magnetic permeability $\mu_2$ at a high frequency band. Such magnetic substances may be mixed to form a single magnetic substance, or two separate magnetic substances with magnetic permeabilities $\mu_1$, $\mu_2$ may be combined and configured as illustrated in FIG. 2(f). FIG. 2(g) illustrates an antenna in which the resonance NFC coil 24 is further installed. FIG. 2(h) illustrates an example in which the magnetic sensor coil 2 and the winding NFC coil 23 are separately wound around the same magnetic sensor core 1.

Figure 2I:
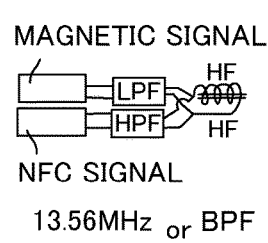
Figure 2J:
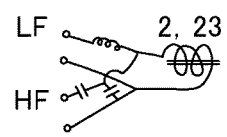

In FIGS. 2(i) and 2(j), a magnetic card signal and an NFC radio frequency signal are mixed or separated by a low pass filter and a high pass filter or a band pass filter and used by a common antenna.

An example in which the transmission/reception sensor system of the present embodiment is applied to a multi-function card will be described with reference to FIGS. 3(a) to 3(e). A metallic frame 13a or a metallic plate 13b in FIGS. 3(a) to 3(e) is a component of the transmission/reception sensor system.

Figure 3A:
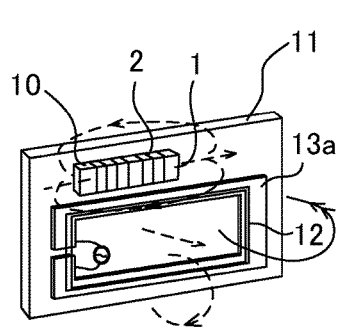
FIGS. 3(a) to 3(e) are diagrams for describing a card including a metallic plate or a metallic frame according to the first embodiment.
Figure 3:
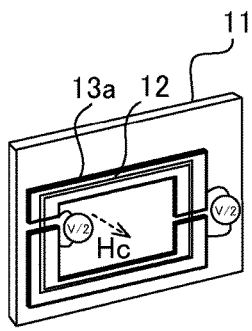
Figure 3:
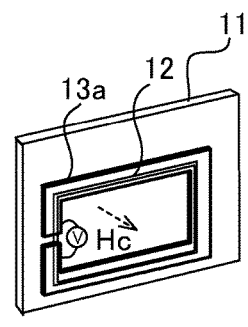
Figure 3C:
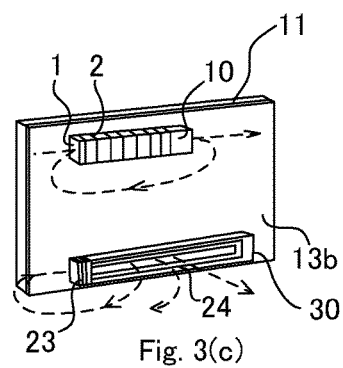

FIGS. 3(a), 3(b1), and 3(b2) illustrate a card 11 including a magnetic sensor 10, a card coil 12, and a metallic frame 13a. FIG. 3(c) illustrates an example in which the metallic plate 13b which is attached on the side of the card coil 12 or along the card and reinforces a bending strength of the card, for example, the metallic plate 13b made of stainless steel (SUS) or the like is disposed. The thin metallic frame 13a or the metallic plate 13b has a thickness of about 100 μm (0.02 to 200 μm) which is sufficiently smaller than a card thickness of 0.76 mm±10% and can be sufficiently contained in the card together with the coil, the substrate thickness, or the like, and thus the thin metallic frame 13a or the metallic plate 13b has a function of reinforcing the bending of the card 11. Moreover, since an inductive voltage of the card coil 12 should not be disturbed, it is necessary to form two cut portions as illustrated in FIG. 3(b1) or one cut portion as illustrated in FIG. 3(b2). Since a voltage is induced to the cut portion, a reverse phase current does not cancel the magnetic field of the coil. It is a similar principle to that in a shield loop.

FIG. 3(b1) illustrates an example in which the thin metallic frame 13a (a material is, for example, SUS) is formed along the card coil 12 with a rectangular-shaped structure. The metallic frame 13a is cut at each short side portion, and a voltage V, that is, V/2 is generated at each cut portion. This voltage is substantially the same as a voltage generated in one coil turn. Therefore, it is possible to divide both sides further, but since the bending strength is reduced, it is preferable that the number of divisions be small. Since the cut position on the left is different from the cut position on the right as illustrated in FIG. 3(b1), a part of the side of the metallic frame 13a does not have a weak point.

FIG. 3(b2) illustrates a metallic frame 13a in which the cut portion is formed in one of the short sides. In this case, substantially the same voltage as the voltage of one coil turn is generated. Since the coil has 2 to 4 turns generally, in the actual coil, inductance caused by self induction and inductance caused by mutual induction are added, and a voltage corresponding to about a square of the number n of turns ($n^2$) is generated. As the metallic frame 13a and the coil approach each other, a stray capacitance increases, an electric current flow in the card coil 12 and the stray capacitor, and the inductance of the card coil 12 decreases slightly.

In order to prevent this, a magnetic sheet 14 may be interposed between the card coil 12 and the metallic frame 13a. In a case in which the card is used while coming into contact with the other metallic surface mentioned above, the same effect in that there is no influence of the metallic surface is obtained. FIG. 3(e) illustrates a cross section of the card, α of FIG. 3(e) illustrates an example in which the metallic frame 13a and the card coil 12 are attached closely to each other, and β of FIG. 3(e) illustrates an example in which the magnetic sheet 14 is interposed between the metallic frame 13a or the metallic plate 13b and the card coil 12. The magnetic sheet 14 may have substantially the same width as the metallic frame 13a. γ of FIG. 3(e) illustrates an example in which the metallic frame 13a is arranged on both sides of the card coil 12. The same operation as in the shield loop is performed.

Figure 3D:
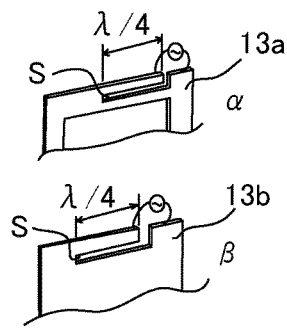
Figure 3E:
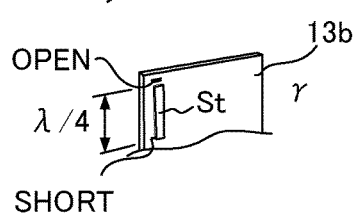

In the metallic frame 13a, preferably, the cut portion is formed on the short side of the card rather than the long side of the card. Since the long side is easily bent, the magnetic substance core, the coil, the display, the circuit such as the IC, the battery, or the like receive stress or is destroyed, and thus it is necessary to reinforce using the thin metallic plate. As illustrated in FIG. 3(c), in this example, the metallic plate 13b is sued for the entire surface, and a metallic surface antenna using an image of a metallic surface is used. The NFC antenna also includes a metallic-compatible antenna equipped with a wound type antenna and a resonator. Therefore, the magnetic sensor 10 and the NFC metal-compatible antenna 30 are attached to the metallic plate 13b of FIG. 3(c), but since it is compatible with the metallic surface, it can be used on the metallic surface. Further, it is also useful when one side of the card is used in contact with the metallic surface such as iPhone, when the magnetic substance is disposed between the coil and the metallic plate to release the magnetic field along the metallic surface as illustrated in FIG. 3(e), or when the magnetic field along the metallic surface is excited by an image effect.

α and β of FIG. 3(d) illustrate a method in which radiation is performed by generating an electric field in a slot portion through a slot or slit S obtained by cutting a part of the metallic frame 13a by a quarter wavelength (electric length). In a case in which the card 11 has a Bluetooth function, since there is no position for installation of an antenna, it is possible to efficiently perform radiation using the metallic surface of the metallic frame 13a. Similarly, the metallic frame 13a can also be used as a transceiving antenna for other UHF bands. α of FIG. 3(d) illustrates an example in which the metallic frame 13a is used, and β of FIG. 3(d) illustrates an example in which the metallic plate 13b is used. Further, radiation performed by a quarter or half wavelength stripline St may be used as illustrated in γ of FIG. 3(d). However, in order not to increase the card thickness, it is advantageous to form a slit (slot) at an appropriate position and perform radiation.

FIG. 4(a) is a cross-sectional view of a card in which a magnetic stripe 61 and the magnetic sensor 10 are separated using the metallic frame 13a. Therefore, the metallic frame 13a extends to the side of the magnetic sensor 10. Since the magnetic sensor 10 is originally capable to generate a plurality of magnetic card signals, it is not necessary to form the magnetic stripe 61 particularly, but the position of the magnetic stripe 61 is set as usual so that the card can be used when electric power is turned off. It can be doubly used by turning the magnetic sensor 10 or the magnetic stripe 61 toward the head side of the reader.

FIG. 4(b) is a cross-sectional view when the metallic frame 13a has substantially the same size as the card coil 12 but does not extend to the side of the magnetic sensor 10. The magnetic sensor coil 2 of the magnetic sensor 10 and the card coil 12 are made commonly, and when a common magnetic sensor core 1 is used, the card coil 12 on the lower side is unnecessary. Since the metallic frame 13a does not shield one side of the magnetic sensor 10, the magnetic field is generated on both the front and the back of the card 11, and when the card is read with the magnetic reader, it is possible to use it without concern for the front and the back of the card. In the case of the card coil 12, when the magnetic sensor core 1 is used in common, since the magnetic field can be obtained on both sides although it comes into contact with the metallic surface, both sides can be used. In FIG. 4(c), the magnetic sensor coil 2 and the card coil 12 are disposed on the metallic surface or opposite surfaces of the metallic frame 13a, and thus it is possible to prevent mutual interference of coil signals.

Next, strength of the card will be described. FIG. 5(a) illustrates bending of a long side of a general card, and FIG. 5(b) illustrates bending of a short side of the card. In FIG. 5(a), it can be bent largely, and displacement $\delta_1$ occurs when small pressure $P_1$ is applied. In FIG. 5(b), when the short side is bent, small displacement $\delta_2$ occurs when the same pressure is applied. In other words, it indicates that the short side is strong against bending ($\delta_1 > \delta_2$). However, since the card containing the metallic frame 13a or the metallic plate 13b according to the invention includes a frame configured with hard metal such as stainless steel or iron, although the same pressure $P_1$ is applied, no displacement occurs as illustrated in FIG. 5(c). In other words, the displacement $\delta$ is $\delta \approx 0$. Similarly, the short side as of FIG. 5(d) is stronger against bending, and although the portion of the metallic frame 13a having with the cut portion is weak against bending, it is not a problem if only one cut portion is formed or two cut portions are deviated from each other as illustrated in FIG. 3(b2). In a case in which the metallic plate 13b is disposed, it is further difficult to bend, and thus a thinner card can be implemented.

Figure 6A:
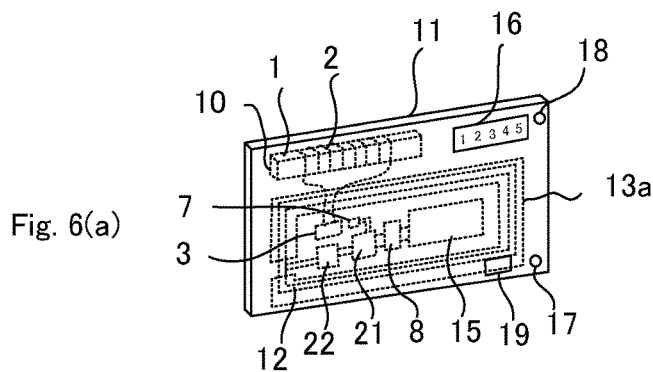
FIGS. 6(a) to 6(d) are diagrams illustrating a component arrangement in a card, a metallic frame, and the like according to the first embodiment.

The components of the card 11 and positions and sizes of the components and the metallic frame will be described with reference to FIGS. 6(a) to 6(d). FIG. 6(a) illustrates positions of the main components in the card 11, and the magnetic sensor core 1 and the magnetic sensor coil 2 constituting the magnetic sensor 10 are disposed on the upper side, the LED 18 is disposed on the upper right end, and the display device 16 is disposed next to the LED 18. The card coil 12 for the NFC is disposed below the magnetic sensor 10 so that substantially the entire surface of the card is used, the thin battery 15 serving as the power source is disposed at the center, the switch 17 is disposed on the lower right side, the biometric authentication device 19 is disposed next to the switch 17, and the signal voltage generating IC 3, the memory 7, the NFC IC chip 22, the battery control element 8, and the controller or the CPU 21 that controls these components are installed.

Figure 6B:
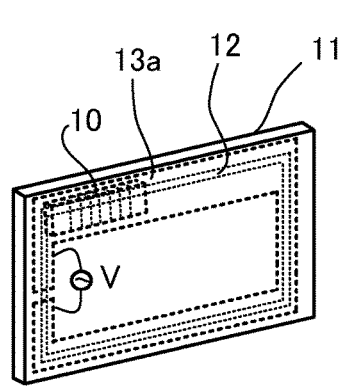
Figure 6C:
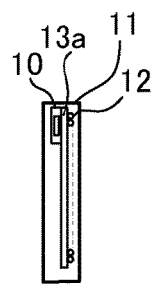
Figure 6D:
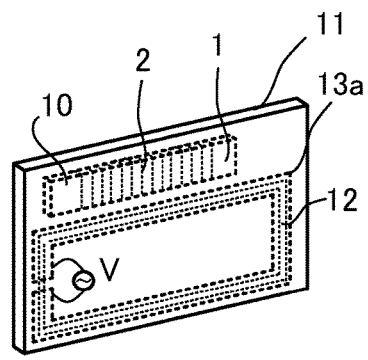

FIGS. 6(b) and 6(c) illustrate an example in which the magnetic sensor 10, the metallic frame 13a having a portion parallel to the magnetic sensor 10, and the card coil 12 for the NFC are installed to be expanded to the full size of the card. FIG. 6(c) is a sectional view of the card 11 of FIG. 6(b). As described above, it is possible to provide the metallic frame 13a with the function for preventing interference between the magnetic sensor 10 and the card coil 12 for the NFC. FIG. 6(d) illustrates an example in which the magnetic sensor 10 and the card coil 12 are installed on upper and lower sides, respectively, and the metallic frame 13a is installed only on the side of the card coil 12.

Figure 7A:
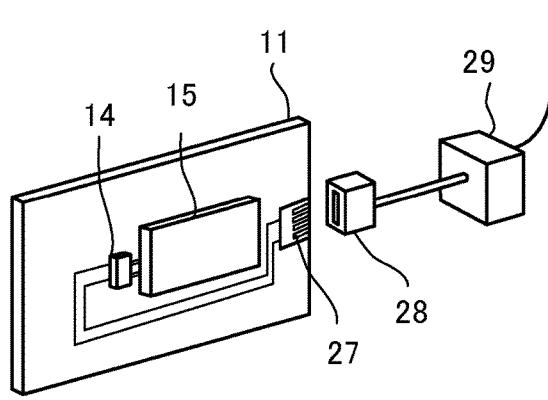
FIGS. 7(a) and 7(b) are diagrams illustrating a method of charging a card according to the first embodiment.
Figure 7B:
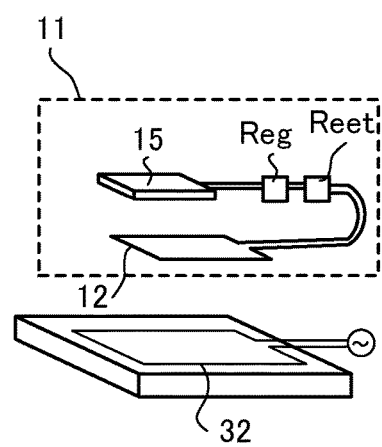

FIG. 7(a) illustrates a method of charging the battery 15 of the card 11 by applying a voltage of about 5 V directly to the battery 15 of the card 11 from an external adapter 29. An output of about 5 V of the external adapter 29 is applied directly to a terminal 27 of the card 11 as an electric current via a connector terminal 28. Then, the battery 15 is charged via the terminal 27 and the battery control element 8. FIG. 7(b) illustrates an example of non-contact charging. Since the card coil 12 for the NFC is installed in the card 11, charging may be performed with the same charging frequency 13.56 MHz as with the NFC via the card coil 12 or a charging frequency of 6.78 MHz which is its half or 27.12 MHz which is its twice. Electric power is transmitted from a power transmission coil 32 on the reader side, and the battery 15 is charged by electric power induced by the card coil 12 via a rectifying circuit Reet and a power voltage control circuit Reg. In order to protect the NFC IC from a high charging voltage or high electric power, it is necessary to change the frequency or to install a switch circuit or a protection circuit for an NFC signal input.

Embodiment 2

In embodiment 1, the multi-function card equipped with the magnetic card emulation circuit has been described as an application example of the transmission/reception sensor system of the invention. Next, as another application example of the transmission/reception sensor system of the invention, a next generation wearable device equipped with a magnetic card emulation system will be described with reference to FIGS. 8(a) to 9(b). A mechanism of generating the magnetic card signal is similar to that in the case of the card, and thus description thereof will be omitted here. In the wearable device, unlike the case of the card, it is difficult to secure a position at which the magnetic sensor is mounter, and thus a method in which a small magnetic sensor is mounted to a frame or a main body of a bracelet or a watch is used. In this case, although the magnetic sensor is not necessarily inserted into a groove of the reader, the magnetic field of the magnetic sensor coil 2 may be directly coupled to the magnetic head 4a or the coil 5 inside the reader. It is also possible to perform coupling by putting the card on the reader with the magnetic sensor coil 2 in the card.

FIG. 8(a) illustrates an example in which a small magnetic sensor 41 or an NFC coil 37 is mounted to a bracelet 101 nearby a display device 16. The NFC coil 37 is installed as illustrated in FIG. 8(a) when there is no installation position inside the magnetic sensor 41. The magnetic sensor 41 includes the transmission/reception sensor system configured with the magnetic sensor 10, the metallic frame 13a, and the like described above in the first embodiment, a CPU, a battery, and the like. Since the bracelet 101 has a wristband shape, if a horizontal one or a protruding vertical one is attached as the magnetic sensor 41, in the case of the vertical thing, it may catch something or be broken or cause injury to someone, and thus it is necessary to usually be stored in a storage case 42. It may be coupled to the coil 5 of the reader on the lower side as it is, or it may have a structure in which the magnetic sensor 41 appears from the storage case 42 of the bracelet 101 only when necessary. Therefore, in examples of FIGS. 8(c), 8(g), 8(f), and 8(h) illustrating structures in which the magnetic sensor 41 is stored in a foldable storage case 42, it is possible to cause the magnetic sensor 41 to be upright such that the magnetic sensor 41 in the folded and flat state pops up by a spring when a lock 43 illustrated in FIGS. 8(g) and 8(h) is unlocked.

When the magnetic sensor 41 which becomes a protrusion is brought into contact with the pick-up magnetic head 4a of the reader described above, it is possible to transmit a signal similar to the signal described above in connection with the card to the magnetic head 4a via the magnetic sensor 41. In FIG. 8(a), the magnetic sensor 41 is arranged on the right side of the display device 16, but as illustrated in FIG. 8(b), the magnetic sensor 41 may be arranged on the left side of the display device 16 and perform coupling with the reader coil in a state in which it is laid horizontally may be used. In the drawings, the display device and the antennas are illustrated as being attached to the inside, but they are commonly attached to the outside or the side.

FIG. 8(c) illustrates an example in which the magnetic sensor 41 stands upright at a right angle with respect to a circumferential direction of the bracelet 101, and FIG. 8(d) illustrates an example in which the magnetic sensor 41 stands along the circumferential direction. Since the tuning of the magnetic sensor 41 changes depending on the direction of the slit of the reader, either can work.

In a case in which the signal from the magnetic sensor 41 is transmitted to the reader as illustrated in FIG. 8(e), the signal may be coupled to the head or the magnetic circuit, or the magnetic sensor 41 is laid horizontally so that the signal can be coupled directly to the pick-up coil 5 or coupled to the magnetic head 4a on the reader side. Such coupling can be decided in accordance with the strength of the signal emitted from the magnetic sensor 41. The signal induced in the coil 5 of the reader is input to a RX/TX circuit that performs reception/transmission, is transferred to a Dec circuit that decrypts and processes the signal, and a magnetic signal ID, a type of card associated with it, and the like are read.

FIG. 8(f) illustrates the magnetic sensor 41 and the storage case 42. The storage case 42 is attached integrally with the bracelet 101. It is not illustrated as an embedded type in FIG. 8(f), but a configuration in which it is stored to be substantially flat with the bracelet 101 so that direct magnetic coupling with the magnetic reader coil is performed without being inserted into the slit as in the examples of FIGS. 8(b) and 8(e) may be employed. The slide lock 43 is attached so that the magnetic sensor 41 is locked when the magnetic sensor 41 is stored in the storage case 42. Normally, as illustrated in FIG. 8(g), the magnetic sensor 41 is folded and there is no protrusions. FIG. 8(h) is a cross-sectional view when the perspective view of FIG. 8(g) is viewed from the side.

FIG. 8(i) is a block diagram of the bracelet 101. A display device Display is disposed on the upper left side, the NFC coil is disposed therebelow, a sensor circuit that indicates a health condition such as a pulse or a body temperature, an exercise quantity, or the like is disposed therebelow, a sensor circuit that transfers information of a magnetic stripe card of the present purpose is disposed therebelow, and a CPU that controls the components and a memory are disposed. Further, a magnetic coil and magnetic signal Tx/Rx circuit are disposed. Bluetooth that transmits signals to smartphones or other devices is also disposed.

Figure 9A:
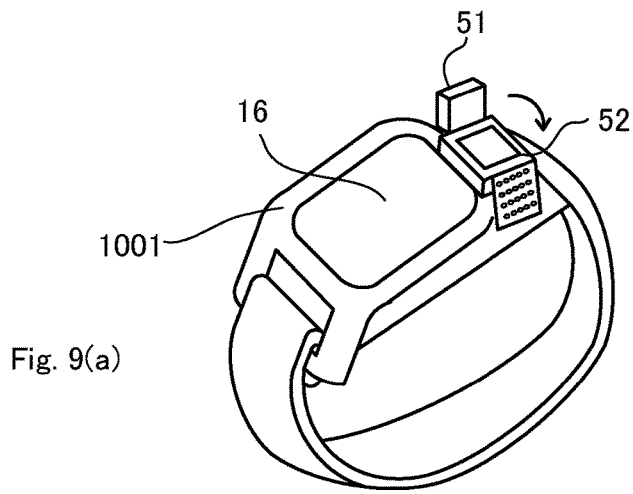
FIGS. 9(a) and 9(b) are diagrams for describing a state in which a small magnetic sensor is attached to a wristwatch type wearable device according to the second embodiment.

Next, FIG. 9(a) illustrates a wristwatch type wearable device 1001. A small magnetic sensor 51 is disposed behind, around, or beside a watch type display device 16, and the magnetic sensor 51 is usually stored in a storage case 52 as a fixed type or a foldable type. The magnetic sensor 51 stands up by aid of the spring only when a signal is desired to be applied to the magnetic reader. This structure is similar to that of FIGS. 8(a) to 8(h), and thus description thereof is omitted here. The magnetic sensor 51 includes the transmission/reception sensor system configured with the magnetic sensor 10, the metallic frame 13a, and the like described above in the first embodiment, a CPU, a battery, and the like.

Figure 9B:
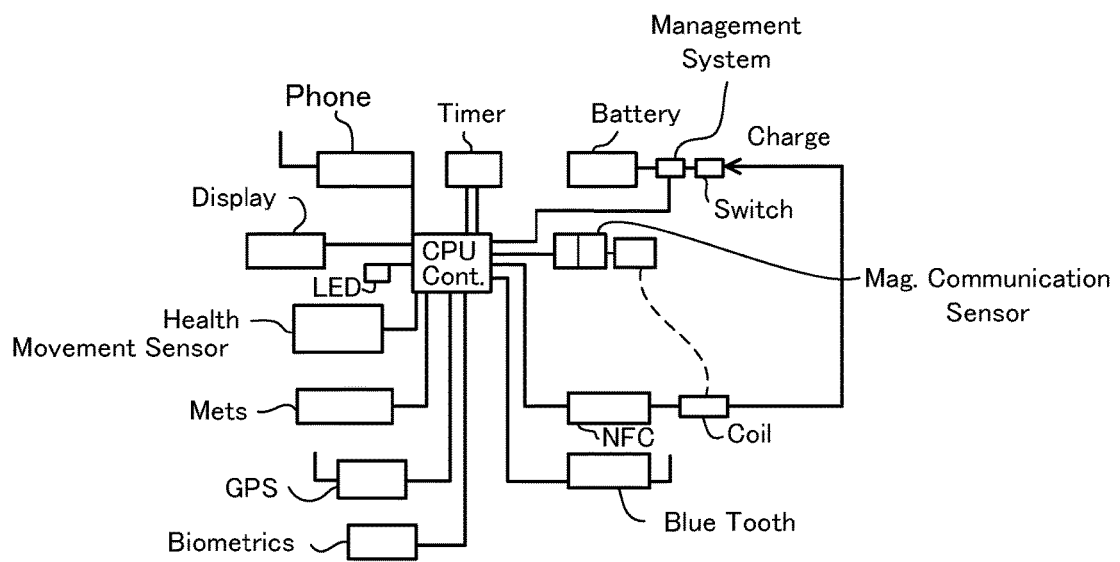

The magnetic sensor 51 may be directly coupled with the circuit of the reader. FIG. 9(b) is a block diagram of an applicative example.

In FIG. 9(b), a telephone function, a display function, a lighting indicating operation, a health sensor function, an exercise quantity, a position sensor, and an identity verification sensor are disposed in order from the upper left side, and a timer, a battery, a switch, a magnetic sensor, an NFC function, a coupling coil, a Bluetooth communication function, and the like are disposed in order from the upper right side, and various ideas are employed to obtain respective features. It is already mentioned that charging the battery with NFC coupling coil is possible.

Figure 10A:
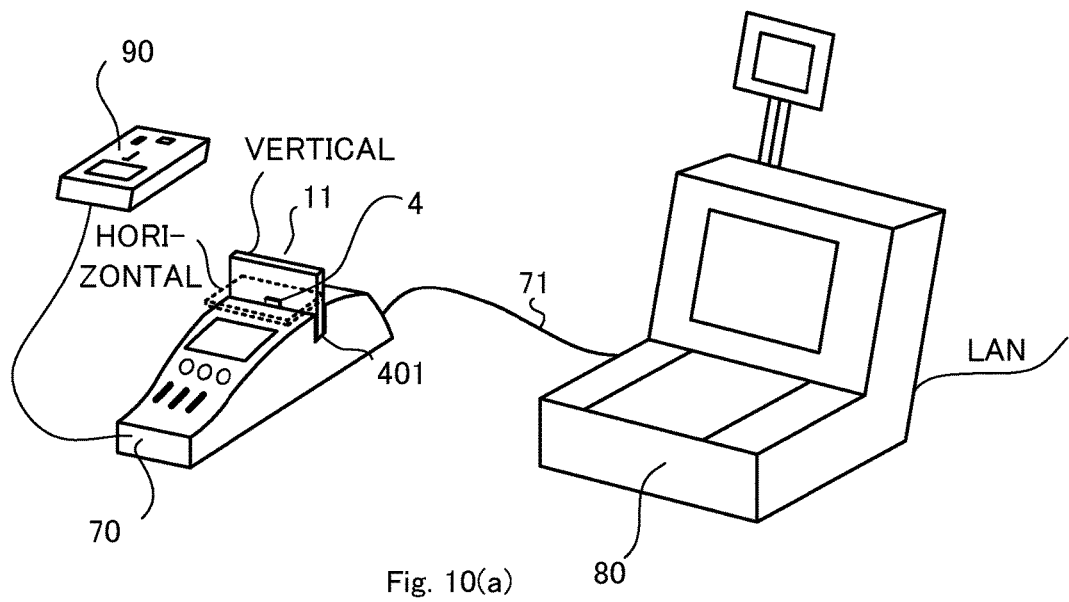
FIGS. 10(a) to 10(b) are diagrams for describing a POS terminal, a card reader terminal, and a PIN terminal according to the second embodiment.
Figure 10B:
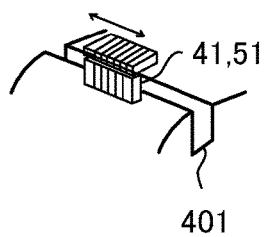

FIG. 10(a) is a diagram illustrating a state in which a card reader terminal 70 conventionally used is used together with a POS terminal 80. As illustrated in FIG. 10(b), a magnetic head 4a of the card reader terminal 70 is attached to a wall surface of a slit 401 serving as a passage of the card 11, and reads a signal generated in accordance with motion of the magnetic stripe.

Transmission and reception of the signal from the magnetic sensor are performed when the magnetic sensor approaches a reading circuit of the reader equipped with a magnetic circuit since a signal generated from the semiconductor excites the magnetic sensor and is read by the magnetic head 4a, the magnetic circuit 4b, or the coil 5 attached to the reader although the card 11 is not moved.

In the case of the small magnetic sensors 41 and 51, it is possible to perform coupling of the signal by bringing them close to a portion having the magnetic circuit or bringing them into close contact with an upper portion of the magnetic circuit so that coupling is directly performed from the sensor circuit while generating the signal as illustrated in FIG. 10(b). If the magnetic sensors 41 and 51 also employ the coil of the winding as illustrated in FIG. 1(b2), it is possible to perform coupling with the reader without concern for the direction.

Generally, the card reader terminal 70 is placed near the POS terminal 80 and connected via a cable 71 (232C, USB, or LAN). Usually, a PIN terminal 90 and an NFC terminal are separately disposed and connected to the card reader terminal 70.

As described above, the conventional magnetic card reader can be used without change, a plurality of cards are integrated into one card, a similar function is implemented through a wearable device, and access to a magnetic reader is performed through a small sensor, and thus the invention can be used in small retail stores having no NFC reader as a general-purpose device with a high degree of security, whereby a significant practical effect is provided.

REFERENCE NUMERALS 1 magnetic sensor core
2 magnetic sensor coil
3 signal voltage generating IC
4a magnetic head
4b magnetic circuit
5 coil
7 memory
10 magnetic sensor
11 card
12 card coil
13a metallic frame
13b metallic plate
14 magnetic sheet
15 battery 16 display device
19 biometric authentication device
21 CPU
23 winding NFC coil
24 resonance NFC coil
41 magnetic sensor
43 lock
51 magnetic sensor
61 magnetic stripe
70 card reader terminal
80 POS terminal
90 PIN terminal

What is claimed is:

1. A transmission/reception sensor system, comprising:
   a magnetic sensor including a coil wound around a magnetic sensor core;
   an NFC coil formed in a planar shape; and
   a metallic frame of a loop shape which is installed along the NFC coil and includes one or more cut portions.

2. The transmission/reception sensor system according to claim 1,
   wherein the magnetic sensor further includes a coil wound orthogonally to the coil wound around the magnetic sensor core.

3. The transmission/reception sensor system according to claim 1,
   wherein the metallic frame has a hollow rectangular shape, and the cutting portion is formed in a short side portion of the rectangular shape.

4. The transmission/reception sensor system according to claim 1,
   wherein a magnetic sheet is interposed between the metallic frame and the NFC coil.

5. The transmission/reception sensor system according to claim 1,
   wherein the metallic frame has a slot with a length of a quarter-wavelength, and the slot is used as an antenna for Bluetooth.

6. The transmission/reception sensor system according to claim 1,
   wherein a stripline of a quarter-wavelength or a half-wavelength is installed in the metallic frame, and the stripline is used as a microstrip antenna.

7. A The transmission/reception sensor system according to claim 1, comprising:
   a magnetic sensor including a coil wound around a first magnetic sensor core; and
   an NFC antenna including a second magnetic sensor magnetic sensor core, a coil wound around the second magnetic sensor core, and an NFC coil formed on one surface of the second magnetic sensor core in a planar shape.

8. The transmission/reception sensor system according to claim 7,
   wherein the first magnetic sensor core of the magnetic sensor and the second magnetic sensor core of the NFC antenna are shared, and the coil of the magnetic sensor and the wound coil of the NFC sensor are wound around a common magnetic sensor core.

9. The transmission/reception sensor system according to claim 8,
   wherein the common magnetic sensor core is constituted by two magnetic substances having different magnetic permeabilities.

10. The transmission/reception sensor system according to claim 7,
    wherein the first magnetic sensor core of the magnetic sensor and the second magnetic sensor core of the NFC antenna are shared, the coil of the magnetic sensor and the wound coil of the NFC sensor are wound around a common magnetic sensor core as a common coil, and a signal of the magnetic sensor and a signal of the NFC antenna are separated by a filter.

11. A The transmission/reception sensor system according to claim 1, comprising:
    a magnetic sensor including a coil wound around a first magnetic sensor core;
    an NFC antenna including a second magnetic sensor core, a coil wound around the second magnetic sensor core, and an NFC coil formed on one surface of the second magnetic sensor core in a planar shape; and
    a metallic plate on which the magnetic sensor and the NFC antenna are installed.

12. The transmission/reception sensor system according to claim 1, further comprising,
    a battery,
    wherein the battery is charged with electric power induced in the NFC coil formed in a planar shape and in a magnetic sensor coil.

13. A multi-function card, comprising:
    a plastic card case; and
    a transmission/reception sensor system having:
    a magnetic sensor including a coil wound around a magnetic sensor core;
    an NFC coil formed in a planar shape; and
    a metallic frame of a loop shape which is installed along the NFC coil and includes one or more cut portions;
    wherein the multi-function card has a function of generating an emulation signal of a magnetic card.

14. A wearable device, comprising:
    a transmission/reception sensor system including:
    a magnetic sensor including a coil wound around a magnetic sensor core;
    an NFC coil formed in a planar shape; and
    a metallic frame of a loop shape which is installed along the NFC coil and includes one or more cut portions.

* * * * *